Sept. 21, 1965    R. W. DAVIES ETAL    3,206,799
APPARATUS FOR MAKING DOPE PELLETS
Filed Feb. 27, 1963    2 Sheets-Sheet 2
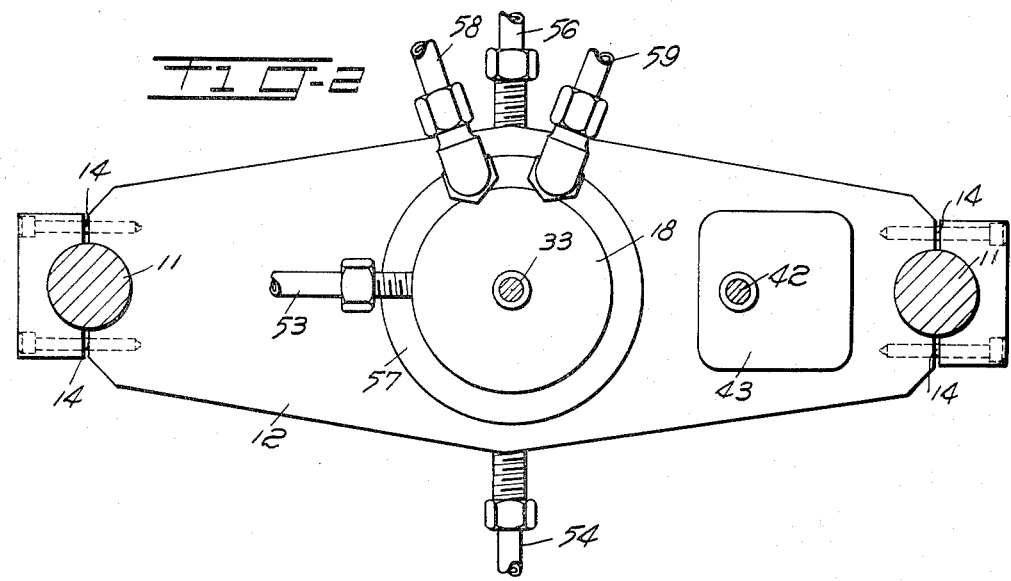
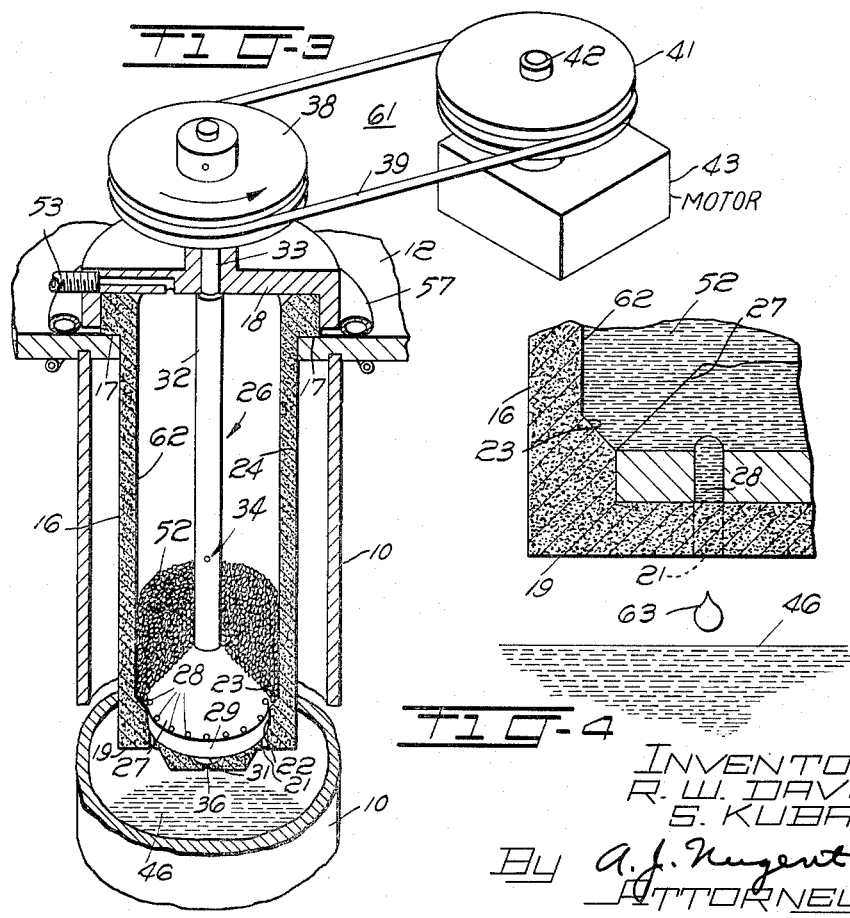
INVENTORS
R. W. DAVIES
S. KUBA
BY A. J. Nugent
ATTORNEY

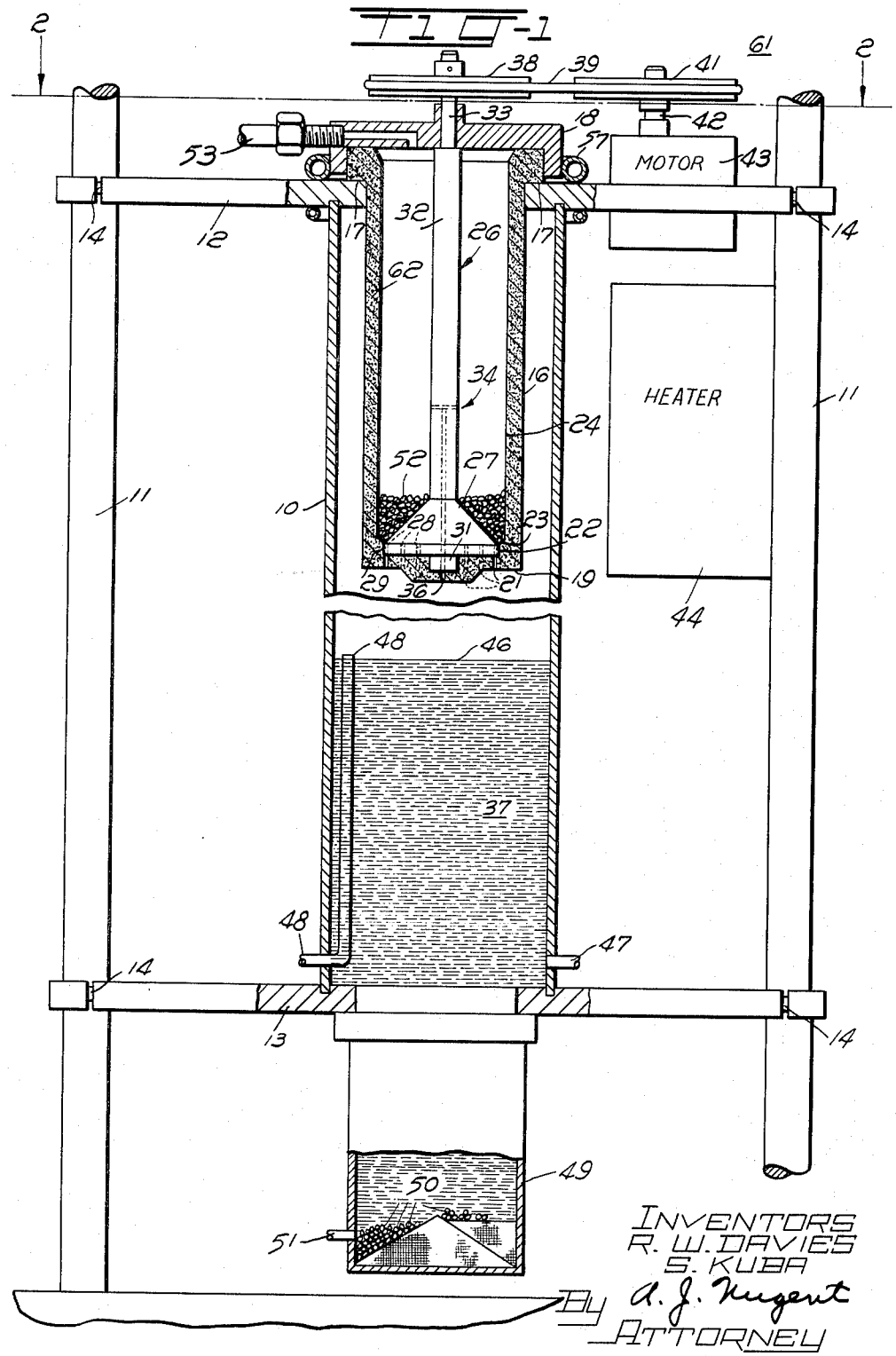

United States Patent Office 3,206,799
Patented Sept. 21, 1965

3,206,799
APPARATUS FOR MAKING DOPE PELLETS
Robert W. Davies, Hellertown, and Samuel Kuba, Allentown, Pa., assignors to Western Electric Company, Incorporated, New York, N.Y., a corporation of New York
Filed Feb. 27, 1963, Ser. No. 261,303
5 Claims. (Cl. 18—2.7)

This invention relates to an apparatus for producing pellets and particularly to a method of and an apparatus for producing doping alloy pellets for semiconductor devices such as transistors and diodes.

The production of doping alloy material used in the manufacture of semiconductor devices is a relatively intricate operation. The ingredients of the doping alloy material must be mixed under controlled conditions, free from contaminants, and converted into diminutive metal pellets of substantially uniform predetermined size. Heretofore, the production of these metal pellets by techniques other than machine cutting which requires a considerable labor input, has been limited to apparatus of the general type disclosed in Patent 2,595,780 to Dunlap. The prior apparatus, however, forms pellets one at a time and is usually confined to a single elemental material for example, the production of pure germanium pellets for asymmetrically conductive devices. Since a large quantity of doping alloy pellets are required in the mass production of semiconductor units, the need has arisen for more efficient and productive apparatus.

Accordingly, an object of this invention is to produce pellets in a novel and expeditious manner.

Another object of this invention is to provide an apparatus for simultaneously producing a plurality of doping alloy pellets.

Another object of this invention is to provide a unique apparatus for producing doping alloy pellets wherein a plurality of pellets are simultaneously extruded through a plurality of openings.

A further object of this invention is to provide a unique apparatus for extruding a plurality of doping alloy pellets through a first and second series of openings alternately brought into alignment in a novel shot tower apparatus. Pressure is provided in a crucible containing the molten pellet charge to force the material through the aligned openings.

These and other objects and features of this invention are attained in one illustrative embodiment which comprises a novel apparatus of the shot tower-type for making doping alloy pellets for transistors and diodes. The tower apparatus includes a chamber having a crucible mounted in an upper portion thereof with a series of holes circularly arranged about the crucible base. A rotatable shaft is mounted in the crucible and supports at its lower end a frustoconical member having a series of holes adjacent its periphery corresponding to the holes in the crucible base. A vertically adjustable heater is mounted adjacent to the crucible to bring the alloy charge to a molten state.

To load the tower, a mixture of materials such as germanium and indium is placed in the crucible. Normally, the holes located in the base and the rotatable member are misaligned to retain the mixture in the crucible. The mixture is brought to a molten state by the heater and then the rotatable member is actuated through an external belt drive, agitating the molten charge and rotating the holes alternately into and out of alignment with the crucible holes. While the holes are aligned, molten droplets are forced through the openings by a pressure differential in the inert atmosphere existing between the crucible and the tower chamber. The droplets fall into continuously running deionized water in a lower portion of the tower which congeals each droplet into a solid pellet. When the solution is exhausted, the tower is shut down and the pellets gathered from a container at the bottom of the tower.

A minimum of handling is required and the germanium alloy pellets are produced on a relatively large scale by the apparatus of this invention. The operation is extremely rapid since a plurality of pellets are simultaneously extruded from the alloy charge. Close control can be maintained over the presence of contaminants, the size and alloy proportions of the product and the rate of production.

Other objects and advantages will be apparent when considered in conjunction with the accompanying drawings, wherein:

FIG. 1 shows a cross sectional view of the novel apparatus for making doping alloy pellets;

FIG. 2 is a top view of the apparatus taken along the line 2—2 in FIG. 1;

FIG. 3 is a broken away isometric view illustrating the invention; and

FIG. 4 shows an alloy pellet in the process of being extruded through matching openings in the crucible.

With reference to FIGS. 1 and 3 of the drawings, the invention in a preferred embodiment comprises a hollow elongated tower or chamber 10 of quartz or a similar material supported by a framework 11 within a heating chamber, for example, a vacuum firing furnace (not shown). The framework 11 supports the chamber 10 by means of upper and lower horizontally extending members 12 and 13 attached thereto. Conventional screw means 14 are employed to mount members 12 and 13 onto the framework 11. A crucible 16 of a non-contaminating material such as graphite, is located in the upper portion of the chamber 10 with an overhanging lip 17 resting on the upper horizontal member 12. A detachable cover member 18 fits over the crucible.

The crucible base 19 includes a series of small holes 21 approximately .015 inch in diameter circularly arranged about a portion 22 of reduced diameter adjoining a sloping internal taper 23 extending from the inner wall 24. A rotatable member 26, preferably of a non-contaminating material such as graphite, having a frustoconical lower portion 27 with a matching series of tiny .015 inch diameter holes 28 located about its outer periphery 29 is journaled in anti-friction bearing means 31 in the base 19 of the crucible 16. The rotatable shaft member 26 includes an intermediate portion 32 extending axially through the crucible 16 and an upper portion 33 of relatively narrow cross-section projecting through an opening in the tower head 18 of the crucible 16. A venting passageway arrangement 34, to prevent a pressure buildup in the crucible 16, extends transversely through member 26 and joins a vertical opening 36 in the crucible 16 leading to the lower portion 37 of chamber 10. A rotatable pulley member 38 is connected to the upper portion 33 of member 26 and belted by means 39 to an adjacent drive pulley 41 which operates off the drive shaft 42 of a motor 43. The motor 43 may be fixedly mounted to the upper horizontal member 12 as illustrated in FIG. 1.

The heating apparatus includes the aforementioned furnace or chamber (not shown) and a local heat source such as an induction heater 44 with a coil carriage connected to the framework 11 and adjustably mounted to ride alongside the chamber 10. Excellent heat control can be attained by positioning the heater 44 in a predetermined relationship with respect to the crucible 16. It is, of course, possible to operate only with the adjustable heater 44, though heat loss should be minimized by selecting appropriate surroundings for the tower 10.

The lower portion 37 of the tower chamber 10 contains continuously running deionized water 46 which is pumped in through an inlet 47 and exits through an overflow 48. A detachable catch bucket or container 49 is located on the bottom of the tower 10 to receive the alloy pellets 50. A drainage outlet 51 is used to drain off the water from the bucket 49.

An inert atmosphere is normally maintained in the tower 10 to prevent contamination of the doping alloy 52. As best seen in FIG. 2, the crucible 16 and tower chamber 10 are purged with inert nitrogen gas through inlets 53 and 54, respectively, with the gas leaving through outlet 56. A higher gas pressure is supplied to the crucible 16 causing extrusion of the mixture 52 through the openings 28 and 21 (FIG. 4) into the chamber 10 which is vented to a lower pressure. When operating, the crucible 16 is usually maintained at a higher pressure than the tower chamber 10 with venting arrangement 34 preventing an excessive buildup of gas pressure within the crucible 16. A water cooling jacket 57 with inlet and outlet pipes 58 and 59 respectively, surrounds the tower head 18 to aid temperature control.

To load the tower 10, the head 18 is removed and a predetermined mixture of germanium and another element, for example, indium, gallium, arsenic or antimony is placed in the crucible 16 through the aperture. A normal charge would be about 200 grams of material. During the loading interval, the crucible holes 21 are misaligned with the holes 28 in the rotatable member 26 to retain the mixture 52 in the crucible 16. When the tower is loaded, the nitrogen and water systems are actuated and the induction heater is started. The mixture 52 is brought to its melting point, approximately in the 950° to 1050° C. range, and held there until melting is complete. The motor 43 is then operated, driving the rotatable member 26 through the pulley arrangement 61.

As mentioned previously, the series of holes 21 in the crucible base 19 and the holes in the frustoconical portion 27 of the rotatable member 26 are initially misaligned and remain out of alignment until actuation of the member 26. The rotating vertical portion 32 and frustoconical base 27 agitate the solution into a homogenous state, while the slope of the frustoconical portion 27 tends to force the molten mixture towards the holes near the chamber wall. The frustoconical slope and the internal crucible taper 23 also help to eliminate any residue which might tend to freeze to the crucible walls 62. The pressure differential of the inert nitrogen atmosphere forces or extrudes the molten alloy mixture through the openings as the holes 28 come into matching alignment with the crucible openings 21. A plurality of droplets 63 are simultaneously extruded and fall into continuously running deionized water 46 in the lower portion of the tower. Each droplet 63 congeals into a solid pellet 50 of substantially spherical configuration when it strikes the water.

The motor 43 is run until the entire alloy charge 52 has been exhausted, then the motor 43 and heater 44 are turned off. The nitrogen and water continue to flow until the entire unit has cooled to prevent oxidation. The water is drained off through outlet 51 and the retainer 49 with the alloy pellets 50 is detached from the tower 10. While the operation of this apparatus has been illustrated as a batch process, which is satisfactory for most purposes due to the large number of pellets 50 produced by a single charge, it is entirely possible that adaptations may be conceived which would function as part of a continuous process.

It is to be understood that the above described arrangements are simply illustrative of the principles of the invention. Numerous other arrangements may be readily devised by those skilled in the art which will embody the principles of the invention and fall within the spirit and scope thereof.

What is claimed is:

1. Apparatus for producing pellets comprising:
a crucible for holding a molten charge of pellet material, the crucible including a circular base having a series of openings therein arranged in a circle,
an inlet means for introducing gas under pressure into the crucible,
a shaft mounted for rotation within the crucible,
means for driving the shaft,
a substantially frustoconically shaped member carried at the lower end of the shaft and including a series of openings located near the edge of the base portion of the frustoconical member for cooperating with the openings of the crucible base to cause the molten pellet material to fall below the crucible when the respective openings of the crucible base and the frustoconical member are periodically aligned as the shaft rotates, the frustoconical surface of the member guiding the molten pellet material to the region of the openings at the base portion of the member, and
means below the crucible for receiving pellets which fall from the crucible, said means being disposed a sufficient distance below the crucible to allow the molten pellets to cool and solidify before coming to rest within said means for receiving pellets.

2. Apparatus according to claim 1 further comprising:
a heater mounted adjacent the crucible.

3. Apparatus for producing pellets comprising:
a crucible for holding a molten charge of pellet material, the crucible including a circular base having a series of openings therein arranged in a circle,
an inlet means for introducing gas under pressure into the crucible,
a shaft mounted for rotation within the crucible,
means for driving the shaft,
a substantially frustoconically shaped member carried at the lower end of the shaft and including a series of openings located near the edge of the base portion of the frustoconical member for cooperating with the openings of the crucible base to cause the molten pellet material to fall below the crucible when the respective openings of the crucible base and the frustoconical member are periodically aligned as the shaft rotates,
the inner wall of the crucible having an inwardly sloping surface which together with the frustoconical surface of the member guides the molten pellet material to the region of the openings at the base portion of the member, and
means below the crucible for receiving pellets which fall from the crucible, said means being disposed a sufficient distance below the crucible to allow the molten pellets to cool and solidify before coming to rest within said means for receiving pellets.

4. Apparatus according to claim 3 further comprising:
a heater mounted adjacent the crucible, and
cooling means mounted about the crucible for rapidly cooling the crucible.

5. In an apparatus for simultaneously producing a plurality of doping alloy pellets:
a tower,
a crucible mounted within an upper portion of the tower for receiving a predetermined proportion of each alloying element, the crucible comprising a base having a plurality of holes located circumferentially thereabout, side portions mounted to the base and a removable head portion positioned over the side portions to enclose the crucible, the head including an aperture extending therethrough,
bearing means located in the crucible base,
a rotatable member journaled in the bearing means having a frustoconical lower portion including a plurality of holes located about the periphery of the frustoconical lower portion for matching the holes in the crucible base and an elongated upper portion extending through the aperture in the head, drive means coupled to the upper portion of the rotatable member for driving the matching holes alternately into and out of alignment with the holes in the crucible base, means for pressuring the material within the crucible to force it through the matching holes during a period of alignment including a supply of noncontaminating gas, individual gas inlet means to the tower and to the crucible from the gas supply, and venting means leading from the crucible to the tower to prevent an excessive build-up of pressure within the crucible, and a common gas outlet from the tower, and means below the crucible for receiving pellets which fall from the crucible, said means being disposed a sufficient distance below the crucible to allow the molten pellets to cool and solidify before coming to rest within said means for receiving pellets.

References Cited by the Examiner

UNITED STATES PATENTS

| | | | |
|---|---|---|---|
| 1,393,383 | 10/21 | Linebarger | 264—13 |
| 1,762,693 | 6/30 | Linebarger | 264—13 |
| 2,287,029 | 6/42 | Dowdell | 264—13 |
| 2,436,211 | 2/48 | Hart | 18—2 |
| 2,574,357 | 11/51 | Stammer et al. | 264—13 |
| 2,595,780 | 5/52 | Dunlap | 264—12 |
| 2,958,099 | 11/60 | Chisholm et al. | 18—12 |

FOREIGN PATENTS

| | | |
|---|---|---|
| 402,611 | 12/33 | Great Britain. |
| 625,941 | 7/49 | Great Britain. |
| 1,230,141 | 9/60 | France. |

ROBERT F. WHITE, *Primary Examiner.*

ALEXANDER H. BRODMERKEL, *Examiner.*